United States Patent

[11] 3,575,426

| [72] | Inventor | Donald F. Durham |
| | | Peoria, Ill. |
| [21] | Appl. No. | 739,270 |
| [22] | Filed | June 24, 1968 |
| [45] | Patented | Apr. 20, 1971 |
| [73] | Assignee | Caterpillar Tractor Co. |
| | | Peoria, Ill. |

[54] PRESSURIZED SEALING ARRANGEMENT
8 Claims, 1 Drawing Fig.

[52] U.S. Cl. .................................................. 277/59,
277/153
[51] Int. Cl. .................................................. F16j 15/32
[50] Field of Search .................................. 277/58, 59,
152, 153; 277/15, 70

[56] References Cited
UNITED STATES PATENTS
3,100,105 8/1963 Randall ........................ 277/59X
3,396,979 8/1968 Balkin et al. .................. 277/153
3,434,727 3/1969 Kollenberger ................. 277/58

FOREIGN PATENTS
545,243 2/1932 Germany ...................... 277/58
880,243 3/1943 France ......................... 277/59
711,737 9/1941 Germany ...................... 277/153
554,331 6/1943 Great Britain ................. 277/153

Primary Examiner—Laverne D. Geiger
Assistant Examiner—Edward J. Earls
Attorney—Fryer, Tjensvold, Feix, Phillips and Lempio

ABSTRACT: Two lip seal assemblies are coaxially mounted around a rotatable shaft to form a chamber therebetween adapted to be pressurized by air to lift the seals out of contact with the shaft. Thus, steady streams of air will flow past the seals to prevent oil or contaminants from moving in a direction opposite to such air flow.

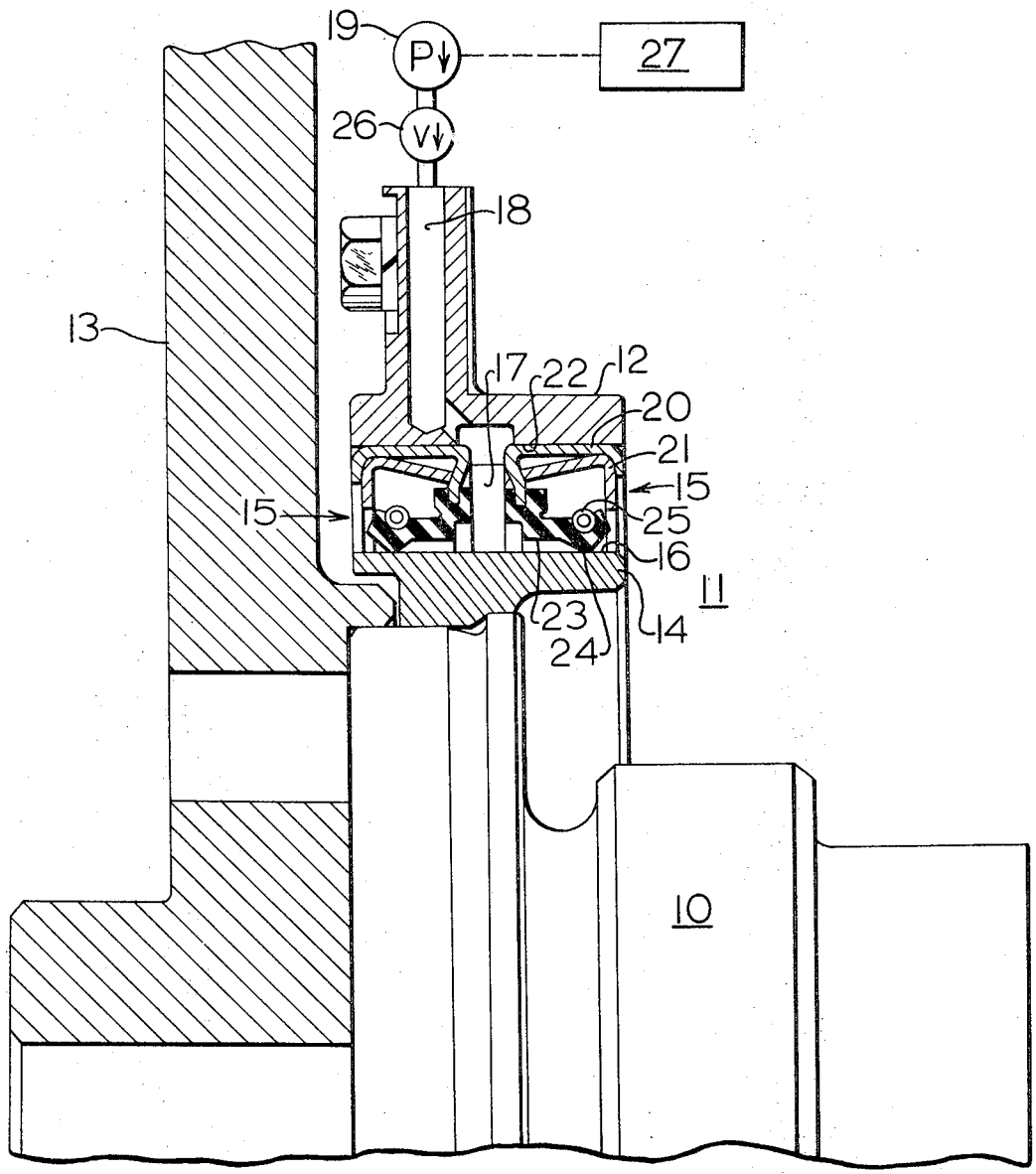

PRESSURIZED SEALING ARRANGEMENT

Internal combustion engines require efficient sealing means at the ends of the crankshaft thereof. Such sealing means essentially perform the two-fold function of retaining oil in the engine's crankcase and preventing contaminants from entering into the engine from the ambient environment. Many unsuccessful attempts have been made to provide an inexpensive and durable seal of this type which will exhibit a high degree of structural integrity over a long period of time.

The primary object of this invention is to overcome the above, briefly described problem by providing a pressurized sealing arrangement comprising a seal assembly having a flexible lip normally contacting a rotatable shaft when the shaft is at rest. A closed chamber, formed on one side of and at least in part by the seal assembly, is adapted to be continuously charged with a pressurized fluid to flex the lip out of contact with the shaft when the shaft is rotated. An opening is thus formed between the lip and shaft to continuously permit such fluid to flow therethrough to prevent retrograde movement of oil or the like past the seal. In the preferred embodiment, two coaxial and spaced seal assemblies are so utilized with the seals at least in part forming the closed chamber.

Other objects of this invention will become apparent from the following description and accompanying drawing.

The drawing is a cross-sectional view of the pressurized sealing arrangement of this invention employed in combination with the rotary crankshaft of an internal combustion engine. Although the sealing arrangement of this invention is hereinafter described in such combination it should be understood that the sealing arrangement could be used in other suitable applications.

A crankshaft 10 is suitably mounted for rotation in an internal combustion engine in a conventional manner. A closed crankcase or oil retaining chamber, partially shown at 11, is suitably arranged to lubricate the crankshaft's support bearings and attendant structures. A housing, partially shown at 12, aids in defining the crankcase. A flywheel 13 may be press-fitted or otherwise suitably secured onto one end of the crankshaft along with a cylindrical collar 14.

Two identical seal assemblies 15 are coaxially mounted between the crankshaft and the housing to seal chamber 11 and to prevent ambient contaminants from passing into the engine's interior. The assemblies are suitably spaced from each other on a smooth, machined surface 16 of the collar to form a normally closed chamber 17 therebetween arranged to communicate with a passage 18 formed in the housing. Means 19, such as a positive displacement air pump operatively connected to be driven by the engine, may be suitably arranged to pressurize chamber 17 for purposes hereinafter more fully explained.

Each annular seal assembly preferably comprises stamped metallic retaining rings 20 and 21 adapted to be press-fitted into a mating bore 22 formed in housing 12. A rubberlike and flexible seal 23, preferably at least in part forming chamber 17, is attached to ring 20 and has a V-shaped lip 24 which is normally maintained in line, sealing contact with surface 16 when the crankshaft is at rest. A garter spring 25 surrounds the lip portion of the seal to provide means for positively urging lip 24 into such normal sealing contact. In certain applications the inherent resiliency of the seal itself may be sufficient to assure such contact and thus the spring could be eliminated in these applications.

In operation and with a motive means 27, such as an engine, running to rotate crankshaft 10 pump 19 will be actuated automatically to communicate a pressurized fluid, preferably air, into chamber 17 via passage 18. The air pressure in the chamber is preferably maintained within a range of from 2 to 8 p.s.i. for many applications. However, it should be understood that such pressure may vary since it is dependent upon a number of design parameters such as the force by which garter spring 25 maintains lip 24 in normal sealing contact with surface 16 and also the physical properties of seal 23.

The air pressure may be constantly regulated by a valve 26 to maintain a predetermined and substantially constant pressure level in chamber 17. Such pressure will function to slightly raise lip 24 of the inboard seal out of contact with surface 16 to form an opening to discharge a steady stream of air into chamber 11. Thus, retrograde movement of lubricating oil out of the crankcase is prevented by the inboard seal. Likewise, the lip of the outboard seal will lift out of contact with surface 16 to discharge a steady stream of air to ambient to prevent contaminants from moving into the crankcase.

From the above description it can be seen that this invention provides an inexpensive and noncomplex sealing arrangement which will continuously exhibit a high degree of structural integrity over a long period of time. It should be noted, for example, that surface 16 does not have to undergo finite machining to provide an effective sealing surface for lips 24. In particular, the lip seal and surface 16 are maintained out of contact during rotation of crankshaft 10 to thereby reduce wear on both the seal and the shaft. Also, when the crankshaft is at rest the seals will function as conventional static lip seals to make intimate and positive contact with surface 16.

I claim:

1. A pressurized sealing arrangement comprising a rotatable crankshaft, motive means for selectively rotating said crankshaft, at least one seal assembly mounted about said crankshaft and having a flexible lip normally contacting said shaft, normally closed chamber means formed on one side of said seal, and means for supplying pressurized air to said chamber means for flexing said lip, said flexible lip constructed to remain in full circumferential contact with said crankshaft when the pressure of said air falls below a predetermined level and to be continuously maintained only slightly out of contact with said crankshaft during rotation whereof when said air pressure exceeds said predetermined level to form an opening therebetween to continuously permit said pressurized air to flow therethrough to continuously prevent contaminants from entering said chamber means.

2. The invention of claim 1 further comprising means surrounding said seal disposed radially outwardly from said lip for normally maintaining said lip in contact with said crankshaft when said chamber means is not pressurized and said crankshaft is not rotating, said lip being V-shaped to form a line contact with said crankshaft positioned axially inwardly from an end of said seal assembly.

3. The invention of claim 1 wherein two of said seal assemblies are coaxially mounted about said crankshaft and spaced from each other to form said chamber means therebetween.

4. The invention of claim 1 wherein said motive means for selectively rotating said crankshaft simultaneously actuates said means for supplying pressurized air to said chamber means.

5. The invention of claim 1 further comprising means for regulating and maintaining said pressurized air at a substantially constant level in said chamber means.

6. The invention of claim 1 wherein said crankshaft has a cylindrical collar secured thereto, said collar having a smooth surface formed on the periphery thereof normally contacting said lip.

7. The invention of claim 1 wherein said chamber means is formed at least in part by said seal.

8. The invention of claim 1 wherein said seal assembly further comprises a rubberlike seal having said lip formed as an integral part thereof and at least one annular retaining ring mechanically attached to said seal by means of a groove formed on radially outer circumferential portions of said seal to prevent axial movement thereof relative to said crankshaft.